United States Patent [19]
Smith

[11] Patent Number: 5,367,684
[45] Date of Patent: Nov. 22, 1994

[54] REGISTER ALLOCATION USING AN IMPROVED REGISTER CANDIDATE USAGE MATRIX

[75] Inventor: Kevin J. Smith, Boulder Creek, Calif.

[73] Assignee: Intel Corporation, Santa Clara, Calif.

[21] Appl. No.: 983,403

[22] Filed: Nov. 30, 1992

[51] Int. Cl.$^5$ ............................................. G06F 9/45
[52] U.S. Cl. .................................. 395/700; 364/280.5
[58] Field of Search ................. 395/500, 700, 800, 375

[56] References Cited

U.S. PATENT DOCUMENTS

| | | | |
|---|---|---|---|
| 4,571,678 | 2/1986 | Chaitin | 364/300 |
| 5,249,295 | 9/1993 | Briggs | 395/650 |

OTHER PUBLICATIONS

F. C. Chow & J. L. Hennessy, The Priority-Based Coloring Approach to Register Allocation, ACM Transaction on Programming Languages & Systems, vol. 12, No. 4, Oct. 1990, (ACM 0164-0925/1000-0501) pp. 501-536.

D. Callahan & B. Koblenz, Register Allocation via Hierarchical Graph Coloring, ACM SIGPLAN 1991 Conference on Programming Language Design & Implementation (ACM 0-89791-428-7/91/0005-0192), pp. 192-203.

P. Briggs, Register Allocation via Graph Coloring, A. Ph.D. Thesis, Rice University, Houston, Tex., Apr. 1992.

*Primary Examiner*—David Y. Eng
*Attorney, Agent, or Firm*—Blakely, Sokoloff, Taylor & Zafman

[57] ABSTRACT

An improved register allocator is provided to the code generator of a compiler. The improved register allocator allocates registers using an improved register candidate usage matrix. The improved register candidate usage matrix comprises row entries, one for each register candidate. Each row entry comprises usage bits indicating at least whether its register candidate is live at the entries, in the bodies, and at the exits of the various basic blocks. The improved register allocator allocates registers by block, deriving interference information from the improved usage matrix. It then merges the register allocation introducing spill code at points where register candidates are split. As a result, a register can be allocated to two register candidates that are live in the same basic block as long as they are not both live at some point in the basic block, and at the same time, a register candidate can be spilled in one basic block and allocated a register in another basic block.

18 Claims, 8 Drawing Sheets

```
INT FUNC (INT A)
    INT B, C, E

B = A + 2;
    FOR (C = 0; C<2000, C XX) {;}
    E = B + 1;

RETURN E
```

*Figure 7a*

| BLOCK 1 | MOV   | ARGUMENT → A    |
|         | ADD   | A, $2 → B       |
|         | MOV   | $0 → C          |
| BLOCK 2 | MOV   | $2000 → D       |
|         | ADD   | C, $1 → C       |
|         | CMPJL | D, C, BLOCK 2   |
| BLOCK 3 | ADD   | B, $1 → E       |
|         | MOV   | E → FUNCTION RETURN |

*Figure 7b*

|   | BLOCK 1 | BLOCK 2 | BLOCK 3 |
|---|---------|---------|---------|
| A | 010 | 000 | 000 |
| B | 001 | 111 | 100 |
| C | 001 | 111 | 000 |
| D | 000 | 010 | 000 |
| E | 000 | 000 | 010 |

*Figure 7c*

|   | BLOCK 1 | BLOCK 2 | BLOCK 3 |
|---|---------|---------|---------|
| A | REG 2 | N/A | N/A |
| B | REG 2 | SPILLED | REG 2 |
| C | REG 1 | REG 1 | N/A |
| D | N/A | REG 2 | N/A |
| E | N/A | N/A | REG 2 |

*Figure 7d*

| | | |
|---|---|---|
| BLOCK 1 | MOV | ARGUMENT → REG 2 |
| | ADD | REG 2, $2 → REG 2 |
| | MOV | $0 → REG 1 |

78

| | | |
|---|---|---|
| BLOCK 2 | MOV | $2000 → REG 2 |
| | ADD | REG 1, $1 → REG 1 |
| | CMPJL | REG 2, REG 1, BLOCK 2 |

80

| | | |
|---|---|---|
| BLOCK 3 | ADD | REG 2, $1 → REG 2 |
| | MOV | REG 2 → FUNCTION RETURN |

| | | |
|---|---|---|
| BLOCK 1 | MOV | ARGUMENT → REG 2 |
| | ADD | REG 2, $2 |
| | MOV | $0 → REG 1 |
| | STORE | REG 2 → MEM |
| BLOCK 2 | MOV | $2000 → D |
| | ADD | REG 1, $1 → REG 1 |
| | CMPJL | D, C, BLOCK 2 |
| | LOAD | MEM → REG 2 |
| BLOCK 3 | ADD | REG 2, $1 → REG 2 |
| | MOV | REG 2 → FUNCTION RETURN |

86a, 84, 86b

*Figure 7f*

REGISTER ALLOCATION USING AN IMPROVED REGISTER CANDIDATE USAGE MATRIX

BACKGROUND OF THE INVENTION

1. Field of the Invention

The present invention relates to the field of computer systems. More specifically, the present invention relates to register allocations performed by compilers of these computer systems.

2. Background

In U.S. Pat. No. 4,571,678, Chaitin described a method for allocating registers based on graph coloring. An interference graph is used to represent the conflicts between register candidates. The register candidates are represented as nodes. Two nodes are connected with an edge if the two register candidates are both live at some point in the program. If the nodes in the interference graph can be colored in k or fewer colors, where any pair of nodes connected by an edge receive different colors, and k is the number of registers available for allocation on the target machine, then the coloring corresponds to an allocation. If k-coloring cannot be achieved, then code are introduced to spill one or more register candidates, and restore them subsequently before they are used. After spilling the node, it is removed from the interference graph. The coloring process is then repeated with the new interference graph. The process is repeated until a k-coloring is found.

Thus, under Chaitin's method, a register may be allocated to two register candidates even though they are both live in the same basic block of a program, as long as they are not both live at some point in that same basic block. However, under Chaitin, a register candidate is either allocated a register or spilled. Once a register candidate is spilled, it is spilled for all basic blocks in which the register candidate is live.

In an ACM article entitled *The Priority-Based Coloring Approach to Register Allocation*, ACM Transactions on Programming Languages and Systems, Vol. 12, No. 4, October 1990, pp 501-536, Chow and Hennessy described a different method for performing global register allocations, (local register allocations are performed by the code generator). Under Chow and Hennessy, the process of coloring is applied first to constrained live ranges, and then to unconstrained live ranges. Unconstrained live ranges have a number of neighboring live ranges in the interference graph less than the original number of registers available for allocation. Constrained live ranges are live ranges that are not unconstrained. A live range is an isolated and contiguous group of nodes in the control flow graph in which a program data value is alive. A node in the control flow graph is a basic block of the program.

Thus, under Chow and Hennessy's method, a live range may be allocated a register in one basic block, but spilled in another basic block. However, a register may not be allocated to two live ranges in a basic block even though they are not both live at some point in that same basic block.

Thus, it is desirable if a register can be allocated to two register candidates that are live in the same basic block as long as they are not live at some point in the basic block as in Chaitin's method, and at the same time, a register candidate can be spilled in one basic block and allocated a register in another basic block as in Chow and Hennessy's method. As will be disclosed, the improved method and apparatus of the present invention for allocating registers substantially achieves the above described desired results.

SUMMARY OF THE INVENTION

An improved method and apparatus for allocating registers using an improved register candidate usage matrix is disclosed. The method and apparatus disclosed has particular application to register allocators of code generators of compilers. Under the disclosed method and apparatus, a register, under certain conditions, can be advantageously allocated to two register candidates that are live in the same basic block, and at the same time, a register candidate can be advantageously spilled in one basic block and allocated a register in another basic block.

The advantageous results are achieved by providing an improved register allocator to the code generator of a compiler. The improved register allocator allocates registers using an improved register candidate usage matrix. The improved register candidate usage matrix of the present invention comprises row entries, one for each register candidate. Each row entry comprises usage bits indicating at least whether its register candidate is live at the entries, in the bodies, and at the exits of the various basic blocks.

The improved register allocator first allocates registers by blocks, deriving interference information from the improved register candidate usage matrix. Then, the improved register allocator merges the register allocation by introducing spill code at the points where register candidates are split.

BRIEF DESCRIPTION OF THE DRAWINGS

The objects, features, and advantages of the present invention will be apparent from the following detailed description of the presently preferred and alternate embodiments of the invention with references to the drawings in which:

FIGS. 7a-7f illustrate an exemplary register allocation under the present invention.

DETAILED DESCRIPTION PRESENTLY PREFERRED AND ALTERNATE EMBODIMENTS

An improved method and apparatus for allocating registers using an improved register candidate usage matrix is disclosed. The method and apparatus disclosed has particular application to register allocators of code generators of compilers. Under the disclosed method and apparatus, a register, under certain conditions, can be advantageously allocated to two register candidates that are live in the same basic block, and at the same time, a register candidate can be advantageously spilled in one basic block and allocated a register in another basic block. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
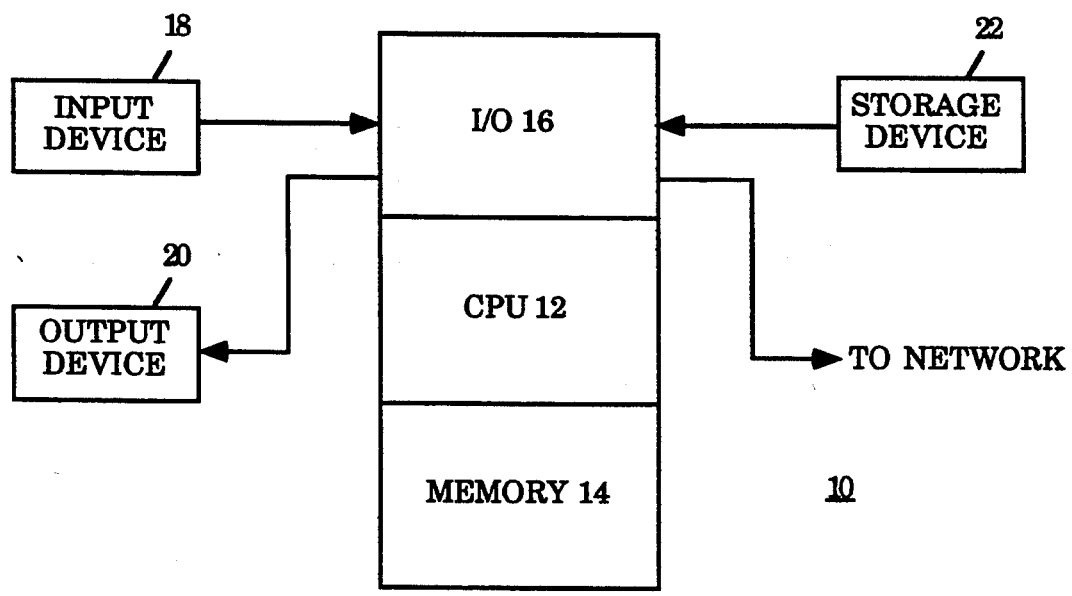
FIG. 1 illustrates an exemplary computer system incorporated with the teachings of the present invention.

Referring now to FIG. 1, a block diagram illustrating an exemplary computer system incorporated with the teachings of the present invention is shown. The exemplary computer system 10 comprises a central processing unit (CPU) 12, a memory 14, and an I/O module 16. Additionally, the exemplary computer system 10 also comprises a number of input/output devices 18 and 20, and a number of storage devices 22. The CPU 12 is coupled to the memory 14 and the I/O module 16. The input/output devices, 18 and 20, and the storage devices 22 are also coupled to the I/O module 16. The I/O module 16 in turn is coupled to a network.

Except for the manner they are used to practice the present invention, the CPU 12, the memory 14, the I/O module 16, the input/output devices, 18 and 20, the storage devices 22, and the network, are intended to represent a broad category of these hardware elements found in most computer systems. The constitutions and basic functions of these elements are well known and will not be otherwise further described here.

Figure 2:
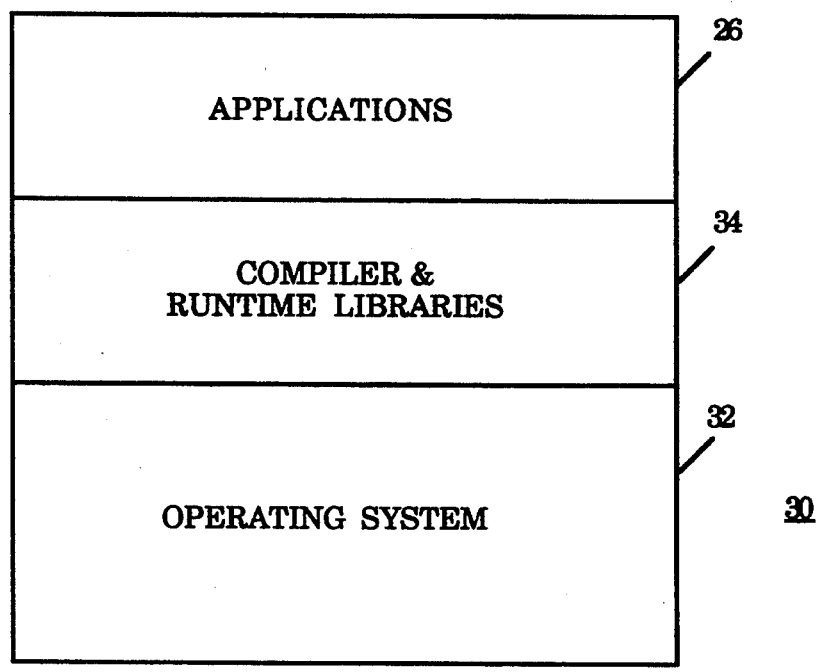
FIG. 2 illustrates the software elements of the exemplary computer system of FIG. 1.

FIG. 2 illustrates the software elements of the exemplary computer system of FIG. 1. Shown are application programs 26 compiled using the compiler 34. The compiled application programs 26 access the runtime libraries 34 for services during execution, which in turn access the operating system 32 for system services. The compiler 34 also accesses the operating system 32 for system services during compilation of application programs 26. Similar to the hardware elements, except for teachings of the present invention incorporated in the compiler 34, these software elements are intended to represent a broad category of similar software elements found in most computer systems. The constitutions and basic functions of these elements are well known and will not be otherwise further described here.

Figure 3:
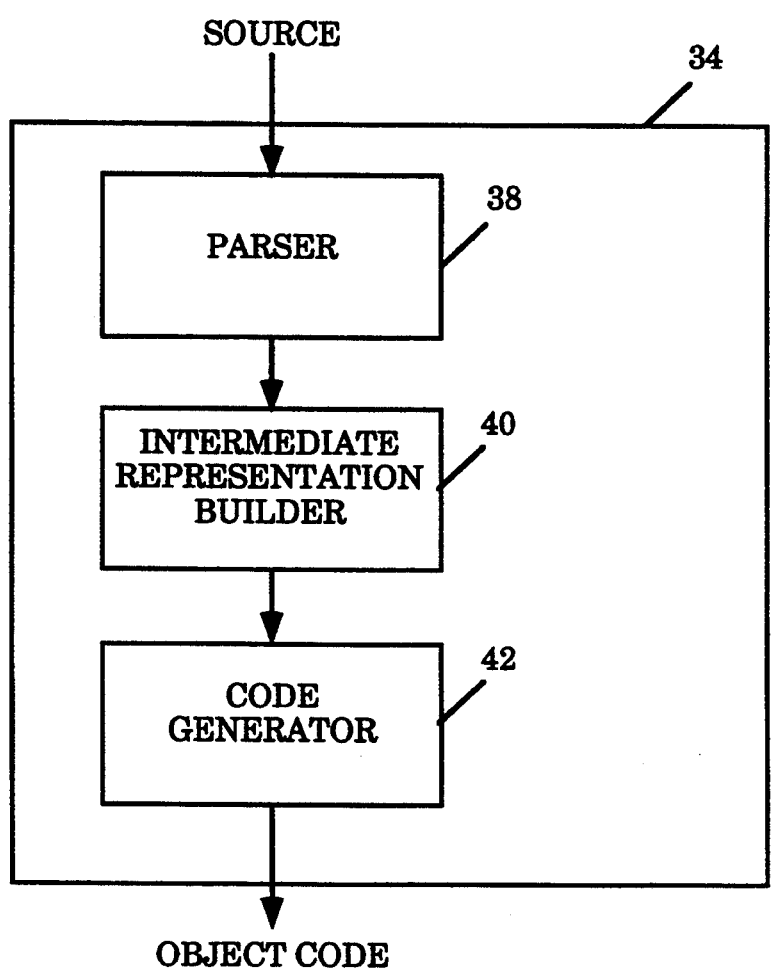
FIG. 3 illustrates one embodiment of the exemplary compiler of FIG. 2.

Referring now to FIG. 3, a block diagram illustrating one embodiment of the compiler of FIG. 2 is shown. In this embodiment, the compiler 34 comprises a parser 38, an intermediate representation builder 40, and a code generator 42. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. Except for teachings of the present invention incorporated in the code generator 42, these components are intended to represent a broad category of similar components found in most compilers. The constitutions and basic functions of these components are well known and will not be otherwise further described here.

Figure 4:
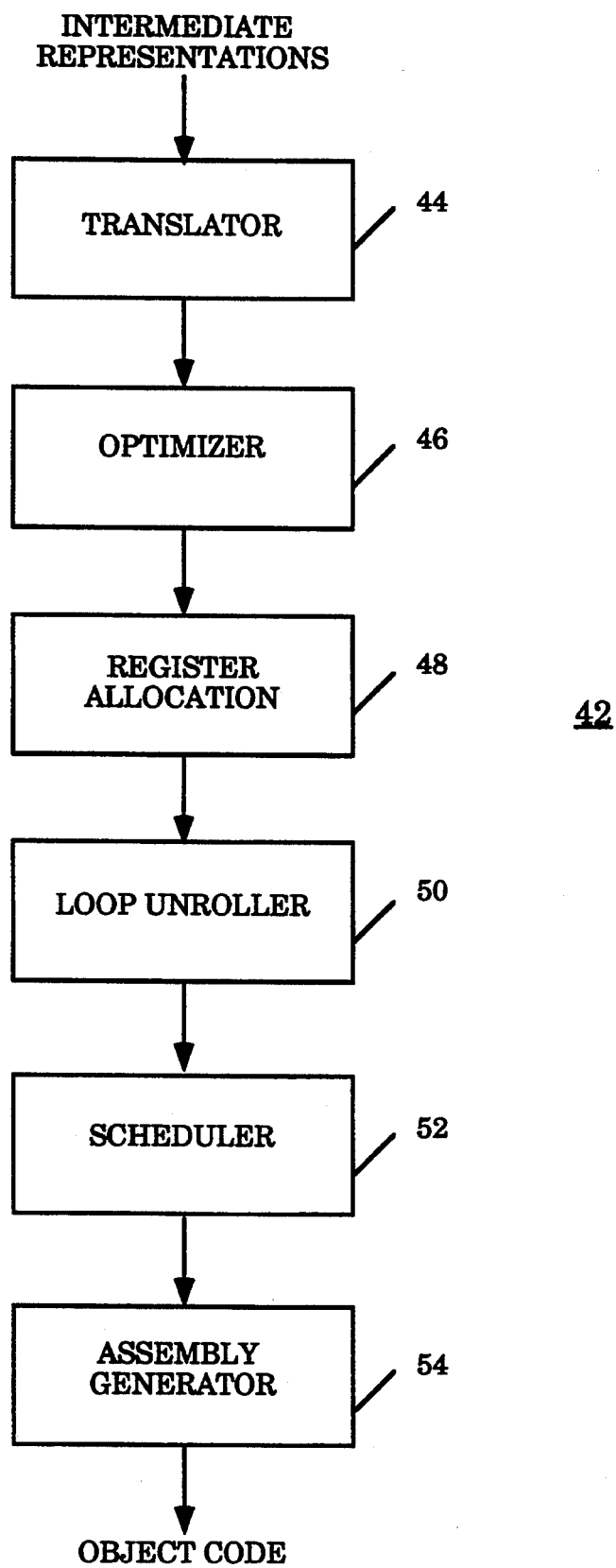
FIG. 4 illustrates one embodiment of the exemplary code generator of FIG. 3.

Referring now FIG. 4, a block diagram illustrating one embodiment of the code generator of FIG. 3 is shown. In this embodiment, the code generator 42 comprises a translator 44, an optimizer 46, a register allocator 48, a loop unroller 50, a scheduler 52, and an assembly code generator 54. The translator 44 receives the intermediate representations as inputs. In response, the translator 44 builds loop table, orders instruction blocks, constructs data flow graphs etc. The optimizer 46 receives the intermediate representations and associated information as inputs. In response, it performs various optimizations. The register allocator 48 receives the optimized intermediate representations and associated information as inputs. In response, it allocates registers of the exemplary computer system of FIG. 1 to the instructions being generated. The loop unroller 50 receives the optimized intermediate representations with allocated registers and associated information as inputs. In response, it restructures the instructions being generated, unrolling loops in the instructions being generated to an optimal degree consistent with the resources available in the exemplary computer system of FIG. 1. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled.

Except for the teachings of the present invention incorporated in the register allocator 48, the translator 44, the optimizer 46, the loop unroller 50, the scheduler 52 and the assembly code generator 54, are intended to represent a broad category of similar modules found in most code generators. The constitutions and basic functions of these modules are well known and will not otherwise further described here.

Additionally, while for ease of understanding, the code generator 42 is being described with the above described embodiment which allocates registers before unrolling the loops in the instructions being generated, and scheduling instructions for parallelism, based on the descriptions to follow, it will be appreciated that the present invention may be practiced with other register allocation, loop unrolling and scheduling approaches, including but not limited to the integrated register allocation, loop unrolling and scheduling approach described in the copending U.S. patent application Ser. No. 07/982,962, entitled Integrated Register Allocation, Instruction Scheduling, Instruction Reduction and Loop Unrolling.

Figure 5:
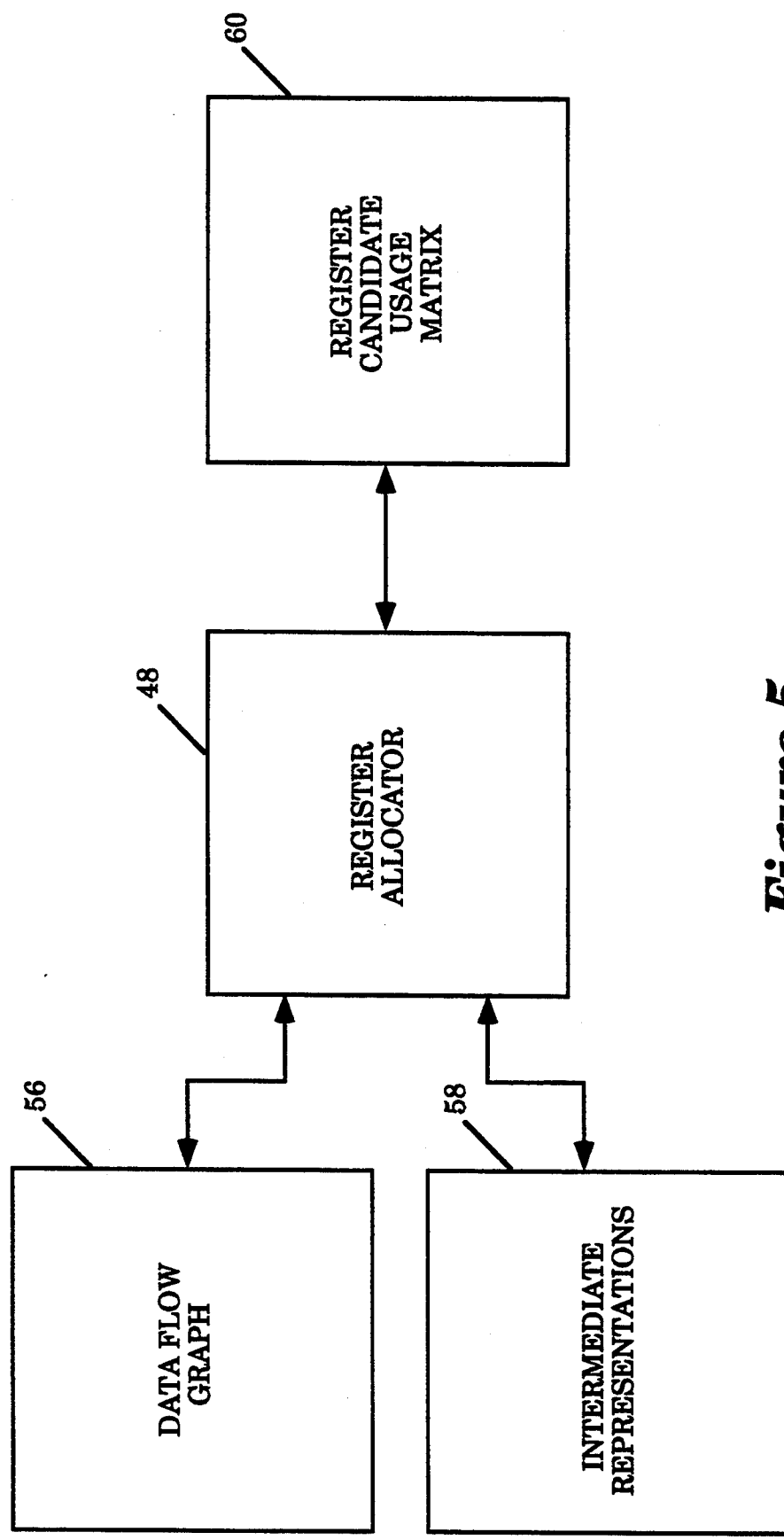
FIG. 5 illustrates the improved register allocator, and the improved register candidate usage matrix of the present invention.
Figure 6:
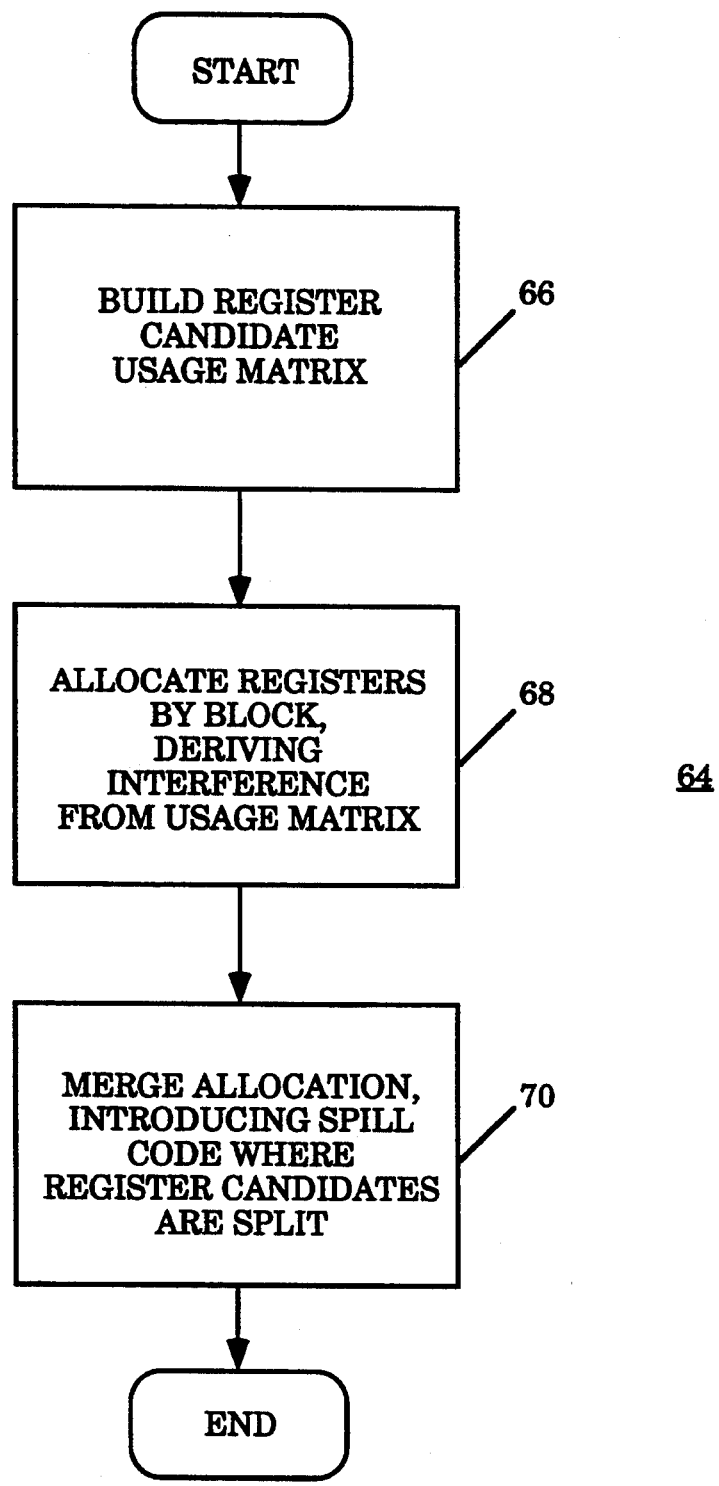
FIG. 6 illustrates the operation flow of the improved register allocator of FIG. 5.

Referring now to FIGS. 5-6, two block diagrams illustrating the improved register allocator of FIG. 4 and its operation flow for allocating registers are shown. As illustrated in FIG. 5, the improved register allocator 48 receives the optimized intermediate representations 58 and associated information, in particular, the data flow graph 56, as inputs. The improved register allocator 48 allocates registers using an improved register candidate usage matrix 60. The improved register candidate usage matrix 60 comprises row entries for the register candidates, one for each register candidate. In the presently preferred embodiment, each row entry comprises a plurality of usage bits indicating whether the register candidate is live at the entries, in the bodies, and at the exits of the various basic blocks of the program being compiled. An exemplary register candidate usage matrix is illustrated in FIG. 7c, which will be described in further detail later.

As illustrated in FIG. 6, upon receiving the optimized intermediate representation and associated information as inputs, the improved register allocator builds the improved register candidate usage matrix based on the inputs received, block 66. Live on exit and live on entry information is determined by solving data flow equations. The improved register allocator then allocates registers by blocks, deriving interference information from the usage matrix, block 68. The improved register allocator determines whether any two register candidates interfere with one another in a block by advantageously performing an AND Boolean operation on the corresponding row entries of the two register candidates. Lastly, the improved register allocator merges the register allocation, introducing spill code where register candidates are split.

In the presently preferred embodiment, the improved register allocator allocates registers to each block on a priority basis. The blocks are prioritized by their loop nesting level, and the register candidates are prioritized by their definition and usage counts. Priority ties are broken arbitrarily. While the presently preferred embodiment employs a straight forward prioritization scheme, it will be appreciated that a more elaborate prioritization scheme may be employed instead.

While for ease of understanding, the present invention is being described with the presently preferred embodiment wherein each row entry of the register candidate usage matrix comprises a plurality of usage bits indicating whether the register candidate is live at the entries, in the bodies, and at the exits of the various basic blocks of the program being compiled, it will be appreciated that the present invention may be practiced with the row entry providing even more granular live information about the register candidate.

Referring now to FIGS. 7a-7f, six block diagrams illustrating an exemplary register allocation under the presently preferred embodiment of the present invention is shown. Shown in FIG. 7a, for ease of understanding, is a simple routine 72 having an invoking argument A, and a returning argument E. The routine 72 comprises three statements. The second statement is a loop. Shown in FIG. 7b is the instructions 74 being generated for the routine of FIG. 7a, before registers are allocated. There are five register candidates, A through E used in three blocks, block 1 through block 3.

Shown in FIG. 7c is the improved register candidate usage matrix 60' for the routine of FIG. 7a. The usage matrix 60' comprises five row entries, one for each register candidate. Each row entry comprises a number of bits indicating whether the register candidate is live at the entries, in the bodies and at the exits of the various blocks of instructions. For examples, register candidate A is live only in the body of block 1; register candidate C is live at the exit of block 1, and at the entry, in the body and at the exit of block 2; register candidate E is live only in the body of block 3.

Assume there are only two registers, REG1 and REG2, available for allocation to these register candidates. Under the straight forward prioritization scheme described earlier, block 2 has a higher priority than block 1 and block 3 which are equal in priority. Register candidates C and D have higher priority than register candidates A, B and E. Register candidates C and D have the same priority, so am A, B and E. Thus, register candidates C and D, may be allocated REG1 and REG2 respectively or vice versa in block 2, and register candidate B will have to be spilled in block 2 given its interference with register candidates C and D in block 2. The interferences in block 2 are indicated by the nonzero results of the AND Boolean operations performed against the corresponding row entries for register candidates B and C, and B and D.

Assuming that register candidates C and D are allocated REG1 and REG2 respectively in block 2, and block 1 is arbitrarily selected for register allocation before block 3, register candidate C will also be allocated REG1 in block 1. Since register candidate B does not interfere with register candidate A, but interferes with register candidate C in block 1, it is allocated REG2 in block 1. Since register candidate A does not interfere with register candidates B or C in block 1, it may be allocated REG1 or REG2 in block 1, even though REG2 is allocated to register candidate B in block 1. For the purpose of illustrating the advantage of the present invention, we will assume REG2 is also allocated to register candidate A in block 1.

Since register candidate B is allocated REG2 in block 1, register candidate B is also allocated REG2 in block 3. Since register candidate E does not interfere with register candidate B, it may be allocated REG1 or REG2 in block 3, even though REG2 is allocated to register candidate B in block 3. Similarly, for the purpose of illustrating the advantage of the present invention, we will also assume REG2 is also allocated to register candidate A in block 1.

The resulting allocation by blocks is summarized in FIGS. 7d and illustrated in more detail in FIG. 7e. Finally, the improved register allocator merges the register allocation together by introducing spill code for register candidate B at the point where register candidate B is split. The content of REG2 (allocated to register candidate B) is stored into memory at the end of block 1, and restored from memory at the end of block 2, 86a and 86b.

It will be appreciated that unlike Chaitin, register candidate B is not spilled for the entire routine, it is advantageously spilled under the present invention only in block 2. Furthermore, unlike Chow, the improved register allocator under the present invention does not have to spill either register candidates A or B in block 1, and REG2 may be advantageously allocated to both register candidates A and B in block 1, and to both register candidates B and E in block 3.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a plurality of instructions and registers, a computer implemented method for a register allocator of a code generator of a compiler of said computer system to allocate said registers to instructions being generated for a program being compiled by said compiler, said method comprising the steps of:

a) said register allocator building a collection of register candidate usage indication vectors for register candidates of said instructions being generated for said program being compiled, said instructions being divided in a plurality of basic blocks, each of said basic blocks comprising an entry, a body, and an exit, said register candidate usage indication vectors comprising indicators denoting at least whether said register candidates are live at said entries, in said bodies, and at sale exits of said basic blocks, and denoting live ranges of said register candidates;

b) said register allocator allocating said registers to said instructions of each of said basic block, on a block by block basis, using said indicators of said collection of register candidate usage indication vectors to determine whether any two register candidates interfere with each other within a basic block; and c) said register allocator merging said register allocation for each of said basic block, inserting spill code for each live range split of a register candidate, said split code insertions being made at corresponding points in said instructions being generated where said register candidate live ranges are split.

2. The method as set forth in claim 1, wherein, said collection of register candidate usage indication vectors comprises one register candidate usage indication vector per register candidate.

3. The method as set forth in claim 2, wherein, each of said register candidate usage indicator vector comprises a plurality of usage bits denoting at least whether the register candidate is live at said entries, in said bodies, and at said exits of said basic blocks, and denoting a live range for the register candidate.

4. The method as set forth in claim 3, wherein, each of said register candidate usage indicator vector comprises a plurality of usage bits in multiples of three bits denoting whether the register candidate is live at said entries, in said bodies, and at said exits of said basic blocks, and denoting a live range for the register candidate.

5. The method as set forth in claim 3, wherein, each of said register candidate interference determination of two register candidates in said step b) is made by performing an AND Boolean operation on the corresponding indicators of the register candidate usage indicator vectors.

6. The method as set forth in claim 1, wherein said block by block register allocations in said step b) are performed in a priority basis.

7. In a computer system comprising a plurality of instructions and registers, an improved register allocator of a code generator of a compiler for allocating said registers to instructions being generated for a program being compiled by said compiler, said improved register allocator comprising:

a) building means for building a collection of register candidate usage indication vectors for register candidates of said instructions being generated for said program being compiled, said instructions being divided in a plurality of basic blocks, each of said basic blocks comprising an entry, a body, and an exit, said register candidate usage indication vectors comprising indicators denoting at least whether said register candidates are live at said entries, in said bodies, and at said exits of said basic blocks, and denoting live ranges of said register candidates;

b) allocation means coupled to said building means for allocating said registers to said instructions of each of said basic block, on a block by block basis, using said indicators of said collection of register candidate usage indication vectors to determine whether any two register candidates interfere with each other within a basic block; and c) merging means coupled to said allocation means for merging said register allocation for each of said basic block, inserting spill code for each live range split of a register candidate, said spill code insertions being made at corresponding points in said instructions being generated where said register candidate live ranges are split.

8. The improved register allocator as set forth in claim 7, wherein, said collection of register candidate usage indication vectors comprises one register candidate usage indication vector per register candidate.

9. The improved register allocator as set forth in claim 8, wherein, each of said register candidate usage indicator vector comprises a plurality of usage bits denoting at least whether the register candidate is live at said entries, in said bodies, and at said exits of said basic blocks, and denoting a live range of the register candidate.

10. The improved register allocator as set forth in claim 9, wherein, each of said register candidate usage indicator vector comprises a plurality of usage bits in multiples of three bits denoting whether the register candidate is live at said entries, in said bodies, and at said exits of said basic blocks, and denoting live range of the register candidate.

11. The improved register allocator as set forth in claim 9, wherein, said allocation means determines whether any two register candidates interference with each other in a basic block by performing an AND Boolean operation on the corresponding indicators of the register candidate usage indicator vectors.

12. The improved register allocator as set forth in claim 7, wherein said improved register allocator makes said block by block register allocations in a priority basis.

13. In a computer system comprising a plurality of instructions and registers, a code generator of a compiler for generating instructions for a program being compiled, wherein said registers are allocated to said instructions being generated, said code generator comprising:

a) a translator for translating intermediate representations of said program into ordered instruction blocks;

b) an optimizer coupled to said translator for receiving said intermediate representations and ordered instruction blocks, and optimizing said instructions being generated for said program being compiled;

c) an improved register allocator coupled to said improved optimizer for receiving said optimized intermediate representations and ordered instruction blocks, and allocating said registers to said instructions of said ordered instruction blocks being generated, said improved register allocator comprising, c.1) building means for building a collection of register candidate usage indication vectors for register candidates of said instructions being generated for said program being compiled, said instructions being divided in a plurality of basic blocks, each of said basic blocks comprising an entry, a body, and an exit, said register candidate usage indication vectors comprising indicators denoting at least whether said register candidates are live at said entries, in said bodies, and at said exits of said basic blocks, and denoting live ranges of said register candidates, c.2) allocation means coupled to said building means for allocating said registers to said instructions of each of said basic block, on a block by block basis, using said indicators of said collection of register candidate usage indication vectors to determine whether any two register candidates interfere with each other within a basic block, and c.3) merging means coupled to said allocation means for merging said register allocation for each of said basic block, inserting spill code for each live range split of a register candidate, said spill code insertions being made at corresponding points in said instructions being generated where said register candidate live ranges are split; and d) a scheduler coupled to said register allocator for receiving said optimized and register allocated intermediate representations and scheduling said instructions being generated for said program being compiled; and e) an assembly generator coupled to said scheduler for receiving said optimized, register allocated, and scheduled intermediate representations and generating said instructions for said program being compiled.

14. The code generator as set forth in claim 13, wherein, said collection of register candidate usage indication vectors comprises one register candidate usage indication vector per register candidate; and each of said register candidate usage indicator vector comprises a plurality of usage bits denoting at least whether the register candidate is live at said entries, in said bodies, and at said exits of said basic blocks, and denoting a live range of said register candidate;

said allocation means determines whether any two register candidates interference with each other in a basic block by performing an AND Boolean operation on the corresponding indicators of the register candidate usage indicator vectors.

15. In a computer system comprising a plurality of instructions and registers, a compiler for compiling a program, wherein instructions being generated for said program being compiled having said registers allocated to them, said compiler comprising:

a) a parser for receiving source code of said program, parsing said source code and generating tokenized statements for said program;

b) an intermediate representation builder coupled to said parser for receiving said tokenized statements and building intermediate representations for said program; and c) a code generator coupled to said intermediate representation builder for receiving said intermediate representations, and generating instructions for said program, said code generator comprising an improved register allocator for allocating said registers to said instructions being generated, said improved register allocator comprising, c.1) building means for building a collection of register candidate usage indication vectors for register candidates of said instructions being generated for said program being compiled, said instructions being divided in a plurality of basic blocks, each of said basic blocks comprising an entry, a body, and an exit, said register candidate usage indication vectors comprising indicators denoting at least whether said register candidates are live at said entries, in said bodies, and at said exits of said basic blocks, and denoting live ranges of said register candidates, c.2) allocation means coupled to said building means for allocating said registers to said instructions of each of said basic block, on a block by block basis, using said indicators of said collection of register candidate usage indication vectors to determine whether any two register candidates interfere with each other within a basic block, and c.3) merging means coupled to said allocation means for merging said register allocation for each of said basic block, inserting spill code for each live range split of a register candidate, said spill code insertions being made at corresponding points in said instructions being generated where said register candidate live ranges are split.

16. The compiler as set forth in claim 15, wherein, said collection of register candidate usage indication vectors comprises one register candidate usage indication vector per register candidate; and each of said register candidate usage indicator vector comprises a plurality of usage bits denoting at least whether the register candidate is live at said entries, in said bodies, and at said exits of said basic blocks, and denoting a live range of said register candidate;

said allocation means determines whether any two register candidates interference with each other in a basic block by performing an AND Boolean operation on the corresponding indicators of the register candidate usage indicator vectors.

17. A computer system comprising:

a) a plurality of instructions;

b) a plurality of registers;

c) a compiler for compiling a program, wherein instructions being generated for said program being compiled having said registers allocated to them, said compiler comprising an improved register allocator for allocating said registers to said instructions being generated, said improved register allocator comprising, c.1) building means for building a collection of register candidate usage indication vectors for register candidates of said instructions being generated for said program being compiled, said instructions being divided in a plurality of basic blocks, each of said basic blocks comprising an entry, a body, and an exit, said register candidate usage indication vectors comprising indicators denoting at least whether said register candidates are live at said entries, in said bodies, and at said exits of said basic blocks, and denoting live ranges of said register candidates, c.2) allocation means coupled to said building means for allocating said registers to said instructions of each of said basic block, on a block by block basis, using said indicator of said collection of register candidate usage indication vectors to determine whether any two register candidates interfere with each other within a basic block, and c.3) merging means coupled to said allocation means for merging said register allocation for each of said basic block, inserting spill code for each live range split of a register candidate, said spill code insertions being made at corresponding points in said instructions being generated where said register candidate live ranges are split.

18. The computer system as set forth in claim 17, wherein, said collection of register candidate usage indication vectors comprises one register candidate usage indication vector per register candidate; and each of said register candidate usage indicator vector comprises a plurality of usage bits denoting at least whether the register candidate is live at said entries, in said bodies, and at said exits of said basic blocks, and denoting a live range of the register candidate;

said allocation means determines whether any two register candidates interference with each other in a basic block by performing an AND Boolean operation on the corresponding indicators of the register candidate usage indicator vectors.

* * * * *

UNITED STATES PATENT AND TRADEMARK OFFICE
CERTIFICATE OF CORRECTION

PATENT NO.   : 5,367,684
DATED        : November 22, 1994
INVENTOR(S)  : Smith

It is certified that error appears in the above-identified patent and that said Letters Patent is hereby corrected as shown below:

In column 1, at line 59, delete "beth" and substitute --both--.

In column 4, at lines 35-36, insert --be-- between "not" and "otherwise".

In column 5, at line 66, delete "am" and substitute --are--.

In column 7, at line 6, delete "sale" and substitute --said--.

In column 7, at line 19, delete "split code" and substitute --spill code--.

In column 10, at line 66, delete "indicator" and substitute --indicators--.

Signed and Sealed this

Twenty-ninth Day of October 1996

*Attest:*

BRUCE LEHMAN

*Attesting Officer*     *Commissioner of Patents and Trademarks*